(12) United States Patent
Gehlot

(10) Patent No.: US 6,304,353 B1
(45) Date of Patent: Oct. 16, 2001

(54) SYSTEM AND METHOD FOR IMPROVED SIGNAL TO NOISE RATIO IN OPTICAL COMMUNICATIONS NETWORKS

(75) Inventor: Narayan L. Gehlot, Sayerville, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/197,154

(22) Filed: Nov. 20, 1998

(51) Int. Cl.[7] ................................................. H04B 10/04
(52) U.S. Cl. ........................... 359/161; 359/181; 359/184
(58) Field of Search ..................................... 359/181, 182, 359/183, 184, 185, 186, 161

(56) References Cited

U.S. PATENT DOCUMENTS 4,843,352 * 6/1989 Kamisaka et al. ...................... 332/22
6,198,559 * 3/2001 Gehlot ................................... 359/161

* cited by examiner

*Primary Examiner*—Leslie Pascal
*Assistant Examiner*—Dalzid Singh
(74) *Attorney, Agent, or Firm*—John A. Ligon

(57) ABSTRACT

A system and method are described for modulating phase and polarization aspects of an optical carrier signal with URZ and $URZ_d$ coded representations of source data, where the source data itself is transmitted via an optical transmission system using UNRZ coding. At a receiver, the URZ and $URZ_d$ signals are summed to provide a UNRZ equivalent encoding of the source data. That UNRZ-equivalent encoded signal is then combined with the received UNRZ signal to produce a composite UNRZ encoded representation of the transmitted source data. In carrying out the method of the invention, noise attributable to random fluctuations in phase and polarization of the optical carrier signal is reduced and the composite UNRZ coded signal obtained at the receiver provides a more reliable indicia of the encoded transmitted data.

13 Claims, 4 Drawing Sheets

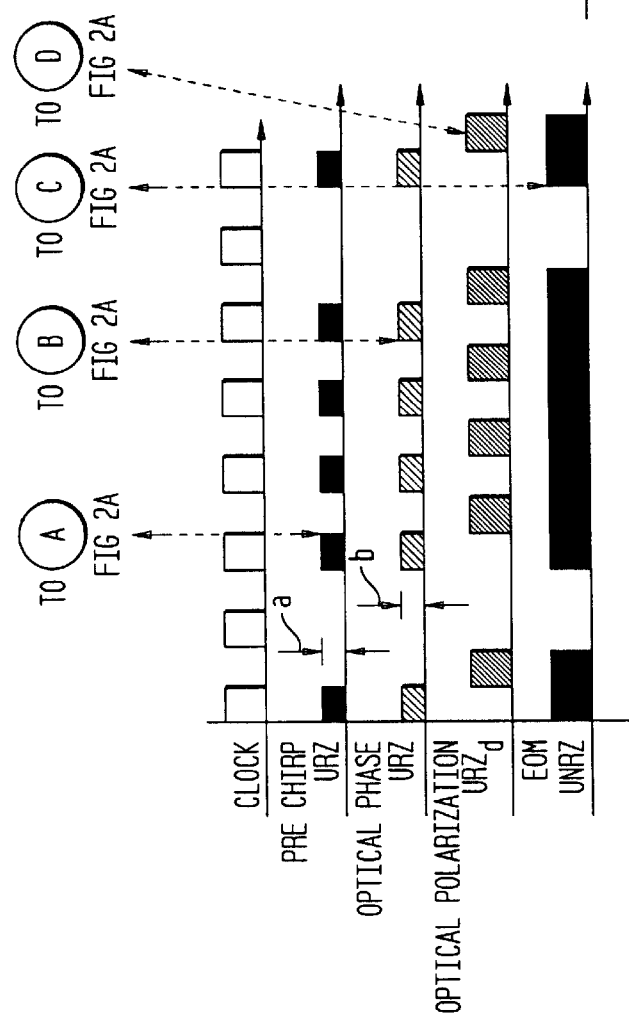

SYSTEM AND METHOD FOR IMPROVED SIGNAL TO NOISE RATIO IN OPTICAL COMMUNICATIONS NETWORKS

CROSS REFERENCE TO RELATED APPLICATIONS

This application is related to U.S. patent application Ser. No. 09/197,223, entitled "SYSTEM AND METHOD FOR GENERATING NRZ SIGNALS FROM RZ SIGNALS IN COMMUNICATIONS NETWORKS," (GEHLOT-7); said related application being concurrently filed with the present application, having the same inventor, and being incorporated herein by reference.

FIELD OF INVENTION

The present invention relates generally to the field of high speed optical communications and more particularly to replacement of unwanted signals generated in an optical communications system with useful signals, where the unwanted signal causes interference to a data signal in such a system.

BACKGROUND OF INVENTION

The transmission of information across a communications channel requires that the user (or source) information be converted to the form of a signal which is compatible with transmission characteristics of the communications channel. Such conversion is in many cases accomplished through modulation of an electrical or optical carrier signal, or both, by the information content itself or by compound modulation—that electrical or optical signal being transmitted over the communications channel. In the case of information in digital form, the "1"s and "0"s representing the data are encoded into a form that can be used to drive, or modulate an aspect of the transmission carrier signal, such as amplitude, frequency, phase, or polarization.

Various modulation techniques for digital data are known in the art, including on-off keying (OOK), intensity modulation (IM), amplitude modulation (AM), frequency modulation (FM), phase modulation (PM) and polarization modulation. The source information may be line coded prior to any modulation. The line coded data becomes the baseband signal modulating the electrical or optical channel carrier. Typically, such line codes map the data value "1" to a high signal value defined by the coding format and the value "0" to a low signal value. While, these line coding formats can include negative (less than zero) signal values for the low signal state, such a negative low signal state cannot be realized for optical transmission systems—the concept of "negative" light not being realizable, at least in practice. Accordingly, as the use of optical transmission media has become increasingly the norm, "unipolar" line codes have been developed in which the low signal state is maintained at zero or a small non-zero signal level.

Two line coding methods of particular interest are designated "unipolar return-to-zero" (URZ) and "unipolar non-return-to-zero" (UNRZ) coding formats. URZ and UNRZ coding are types of on-off-keying modulation well known in the communications arts. UNRZ coding is the common coding technique for transmitting data in optical communications systems.

In optical communications systems, the optical carrier signal is normally provided by a laser light source, such as a laser diode or a light emitting diode (LED). The optical output of the laser diode is typically modulated with the UNRZ-coded baseband signal, representing the coded source information, and this modulated light-wave signal will be transmitted across an optical transmission medium, such as a fiber-optic cable or free space. Modulation of the laser output may be either direct, by varying the laser diode current in proportion to the modulating signal, or indirect, through use of an external modulator. At the receiver end of the optical transmission path, an optical demodulator is applied to recover the coded baseband signal, which signal is then decoded to recover the transmitted source information.

When a laser diode is directly modulated, i.e., the laser diode current is changed in accordance with the digital data to be transmitted, random changes occur in the optical power output (RIN) and in the optical frequency, producing what is termed chirp. As is understood by those skilled in the art, chirp broadens the output spectrum of the laser diode. That is, the linewidth of the laser diode is broadened and thus additional optical frequencies are present at the transmitter within the information signal bandwidth. As a result of chirp, transmission distances are shortened and data rates are reduced. Furthermore, optical power limitations may be imposed to significantly limit energy utilized as a result of the additional frequencies which are present because of chirp. As will also be well understood, the degree of chirp experienced is dependent on modulation waveform types, such as, square wave (maximum chirp), triangular wave, and sinusoidal wave (minimum chirp).

The output signal from laser diodes will often include one or more of the following noise components, even without data modulation being applied: 1) random optical amplitude fluctuations, referred to as relative intensity noise (RIN) amplitude; 2) random optical phase fluctuations, where the optical phase noise may also be related to optical frequency noise; and 3) random polarization fluctuations which result because of random polarization phase changes or individual random amplitude changes of polarization states or both.

In addition to the above-noted limitations which are present with a laser diode used in connection with high speed optical communications, the fiber optic cable as used in the transmission introduces certain impairments into the data due to the non-linearities in the fiber optic cable itself. As would be understood, the impairments may include dispersion, self phase modulation (SPM), cross phase modulation (XPM), etc.

For short-haul, low bandwidth applications, where chirp is normally not a substantial problem, direct intensity modulation of the laser diode is used. For the case of high bit-rate data and/or long haul transmission, however, an external modulator will normally be used to modulate the light carrier signal from the laser diode.

With optical communications systems, random changes in carrier signal phase and random fluctuations of the light polarization in that signal lead to a reduced signal-to-noise ratio (SNR) at the receiver. It is also to be noted that, for the case of long-haul optical transmission systems (as to which external modulation is normally applied) optical amplifiers may also be required to periodically boost the signal level. The fiber optic cable and optical amplifiers are also sensitive to polarization fluctuations.

In the prior art, an effort has been made to reduce the impact of these polarization and phase related noise factors by modulating the polarization and phase signals with the system clock (or a multiple or sub-multiple thereof). This effort has met with decidedly mixed results. In particular, with clock modulation of phase and/or polarization signals, the SNR of the optical signal shows an unstable improvement. It is the inventor's understanding that these prior-art techniques offer some improvement for certain data patterns and a degradation for other data patterns. Among the problems known to occur with such clock modulation of phase and polarization signals, the clock delay and power penalty or gain is dependent on a wavelength and data pattern. For wavelength division multiplexing (WDM) or dense wavelength division multiplexing (DWDM) systems, this is a very expensive and time consuming method to implement. Any perturbation from neighboring channels also poses problems in optimization because optical amplifier gain is pattern dependent when OOK modulation is used. Moreover, the harmonics of the clock generated signal components are hard to filter and are a source of unwanted interference at the transmitter, the receiver and in the transmission channel.

Accordingly, there is a need in the art for an optical transmission system which provides an improved method for reducing unwanted signal generation with the use of system clock (or multiples/sub-multiples) and the interference to a data signal resulting therefrom. There is also a need to obtain a dependable and stable improvement in such unwanted interfering signals across the transmitter, optical transmission channel, optical amplifier(s) and receiver.

SUMMARY OF THE INVENTION

A system and method are described for providing a reduction in unwanted interfering signal generation for an optical transmission system by applying a novel modulation technique for phase, polarization and pre-chirp aspects of an optical carrier signal. In particular, according to the methodology of the invention, a URZ coded representation of the data to be transmitted via such an optical transmission system is applied to modulate a pre-chirp signal and either the phase or the polarization of the optical carrier signal, and another $URZ_d$ coded representation of that data, delayed by an incremental delay chosen to cause the second $URZ_d$ coded signal to be delayed by approximately one-half of a clock interval upon receipt of that signal at the receiver, is applied to modulate the other of the carrier signal phase and/or polarization, or vice versa.

A UNRZ coded representation of the data to be transmitted is used to modulate the amplitude of the optical carrier signal, preferably using an external optical modulator. At the receiver, the UNRZ coded signal is recovered through a demodulation operation, while at the same time, the URZ and $URZ_d$(delayed) coded signals are recovered by demodulation of the URZ-modulated aspects of the optical carrier signal. A sum of the URZ and $URZ_d$(delayed) coded signals is obtained, which, according to the method of the invention, is equivalent to a UNRZ coded representation of the encoded data. That UNRZ equivalent signal is then added to the demodulated UNRZ signal described above to provide a composite UNRZ coded representation of the transmitted data.

In carrying out the above-described method of the invention, noise attributable to random fluctuations in phase and polarization of the optical carrier signal is minimized and the composite UNRZ coded signal obtained at the receiver provides a more reliable indicia of the encoded transmitted data and thus a higher probability of successfully recovering that underlying data through a decoding of that composite signal. In combining the sum of the URZ and $URZ_d$ coded signals (which are used to modulate pre-chirp of the laser and phase and polarization of the optical carrier signal) with the UNRZ-coded data signal, constructive interference operates to generate a signal at the receiver with an improved overall SNR along with largely eliminating drawbacks of prior art methods.

BRIEF DESCRIPTION OF THE DRAWINGS

FIG. 2B illustrates, via timing diagrams, illustrative signal waveforms for different stages of the embodiment of the invention shown in FIG. 2A.

DETAILED DESCRIPTION

Figure 1A:
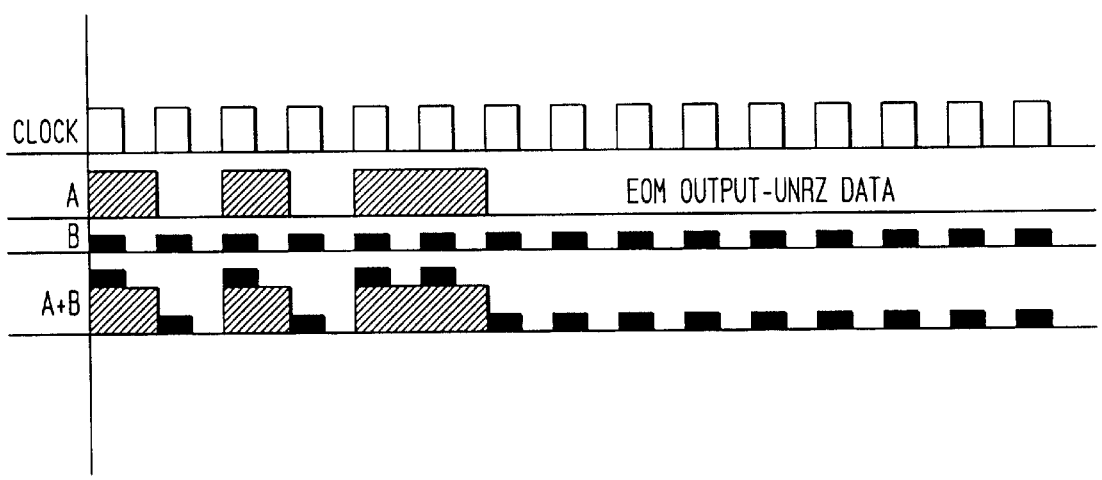
FIG. 1 provides an illustration of the impact of prior-art clock modulation for various sets of input data.

The invention is an apparatus and method for use with a high speed optical transmission system, and which reduces the SNR penalty incurred due to phase and polarization variations and other limiting factors associated with laser diodes and their corresponding optical networks. In order to achieve such an improvement in SNR, the present invention takes advantage of a unique hybrid coding methodology developed by the inventor which enables two occurrences of identical URZ data to be transmitted (one occurrence being delayed by a given amount) and the two transmissions being later combined to produce UNRZ coded data. As is explained more fully in co-pending U.S. patent application Ser. No. 09/197,223 entitled SYSTEM AND METHOD FOR GENERATING NRZ SIGNALS FROM RZ SIGNALS IN COMMUNICATIONS NETWORKS (GEHLOT-7), which is incorporated herein by reference. This hybrid coding methodology has significant advantages over the prior art in that it is an efficient way to receive UNRZ coded data by transmitting URZ coded data. This is significant in that URZ coded data has properties that favor optical transmission while UNRZ coding provides advantages from an overall system standpoint.

As taught by the companion cross-referenced application, the provision of such a hybrid coding methodology, combining features of UNRZ coding and URZ coding, achieves many of the advantages of both, while largely avoiding the disadvantages associated with those coding methodologies. As also taught by the companion cross-referenced application, a central facet of the new coding methodology lies in the inventor's recognition that a UNRZ coded signal for a given data stream is equivalent to a sum of two URZ coded signals for that data stream, where the second of those URZ coded signals ($URZ_d$) is delayed relative to the first URZ coded signal by one-half of a bit interval.

Applying that relationship, the method of the invention operates to cause a URZ coded signal to be generated for the data to be transmitted and to be applied to modulate either the phase or the polarization of the optical carrier signal used for transmission of the data in question. In a preferred embodiment of the invention, that URZ coded signal is applied to provide a pre-chirp modulation of the laser as well. At the same time a delayed $URZ_d$ coded representation of the data is applied to modulate the other of the carrier signal phase and/or polarization. The delay increment for the second (delayed) $URZ_d$ coded signal is chosen to cause that $URZ_d$ coded signal to be delayed by approximately one-half of a clock interval upon receipt of that signal at the receiver. A UNRZ coded representation of the data to be transmitted is used to modulate the amplitude of the optical carrier signal, preferably using an external optical modulator.

At the receiver, the UNRZ coded signal is recovered through a demodulation operation, while at the same time, the URZ and URZ$_d$ coded signals are recovered by demodulation of the phase and polarization aspects of the optical carrier signal (as well as the pre-chirp signal where used). A sum of the URZ and URZ$_d$ coded signals is obtained, which, according to the method of the invention, as described in the companion cross-referenced application designated GEHLOT-7, is equivalent to a UNRZ coded representation of the encoded data. That UNRZ equivalent signal is then added to the demodulated UNRZ signal described above to provide a composite UNRZ coded representation of the transmitted data.

The advantages of the invention relative to prior-art methods can be illustrated by reference to FIGS. 1A–1D. In each of those figures, a baseband data signal is shown (indicated as "EOM output") in juxtoposition with a polarization and/or phase signal modulated with the system clock, designated as the "B" row in the figures. A signal waveform representing the sum of the baseband modulated signal and the clock modulated phase and/or polarization signal(s) is shown below those signal waveforms, and is designated "A"+"B". The figures further include a Clock waveform as a reference signal.

In FIG. 1A, the baseband signal (row A) is shown as random pattern of "1s" and "0s" and the polarization/phase modulation signal (row B) is maintained in synchronism with the Clock. As can be seen in the figure, the sum of these two signals (row A+B) according to the method of the prior art results in some improvement in the pulse amplitude for data "1s" and some degradation for the data "0s".

Figure 1B:
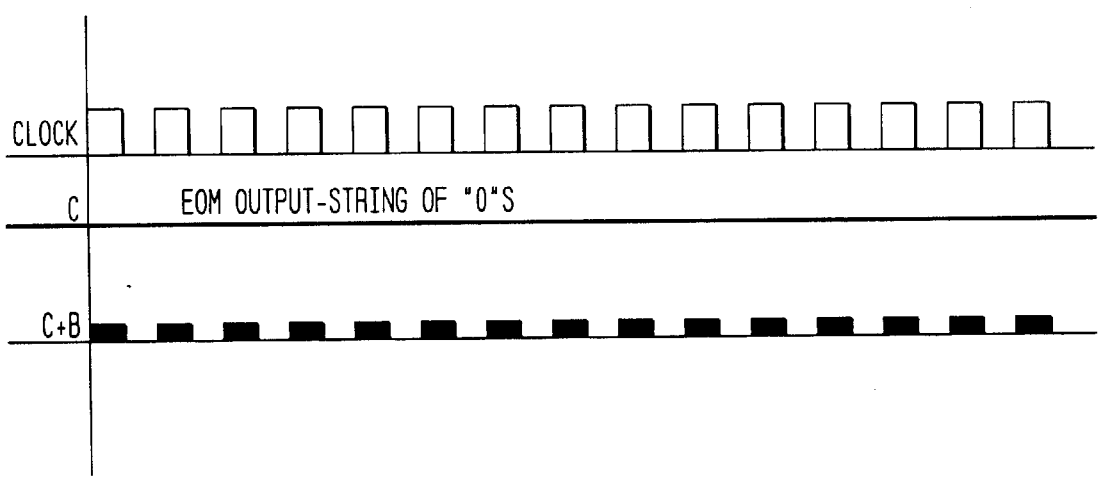
Figure 1C:
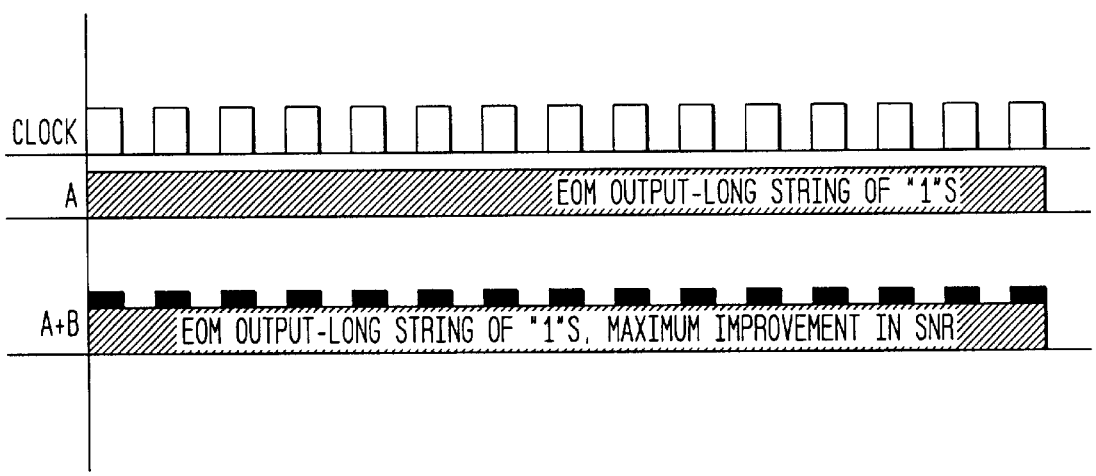

In FIG. 1B, the baseband signal is represented as a string of "0s" (row C) and the polarization/phase modulation signal is the same as for FIG. 1A (and is therefore not repeated in this figure), maintained in synchronism with the Clock. As shown in the figure, the sum of the baseband signal of all "0s" and the clock modulated polarization/phase signal (C+B) represents significant probabability of error in the decoding of one or more of the data "0s." FIG. 1C is analogous to Figure 1B except that the baseband signal is a string of "1s." As seen in the "A+B" sum of the baseband signal and the clock modulated polarization/phase signal, this case alone represents a consistent improvement in the error probability for the recovered data.

Figure 1D:
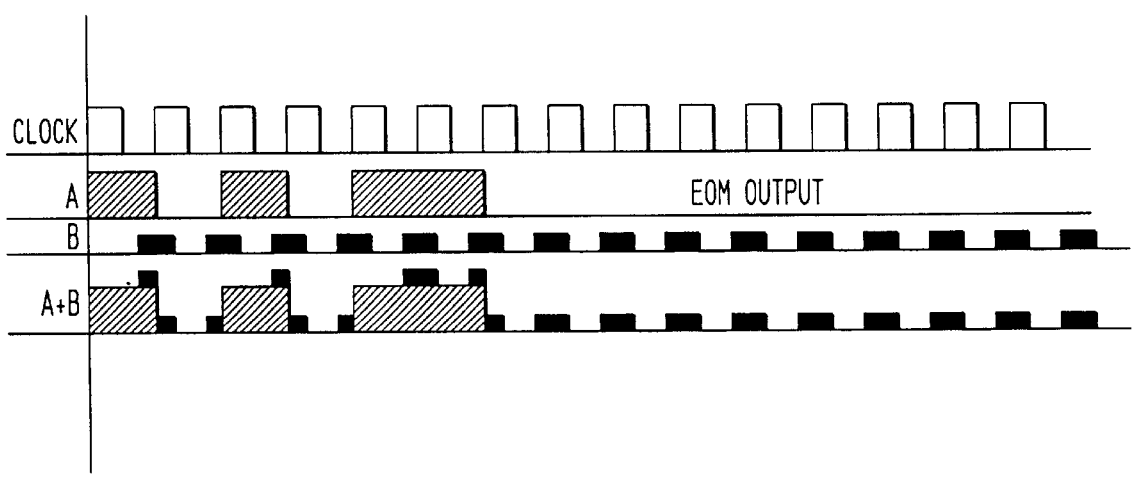

FIG. 1D illustrates the case where the polarization/phase modulation signal has moved out of synchronism with the Clock (row B). In the illustrated case, the baseband signal is again a random pattern of "1s" and "0s" (row A). It will be seen from the "A+B" sum of those signals that a variable improvement is effected for "1s" in the data set and a deterioration for "0s" in the data pattern.

By contrast, according to the method of the invention, the modulating signal for the phase and polarization of the carrier signal is a URZ and URZ$_d$ encoding of the actual data to be transmitted. As explained above, these URZ encoded signals can then be combined, at the receiver, with the UNRZ coding of the data used to modulate the carrier signal itself in a manner which uniformly reinforces the transmitted UNRZ signal. The method of the invention therefore results in a consistent reduction in an error term regardless of the form of the transmitted data.

Figure 2A:
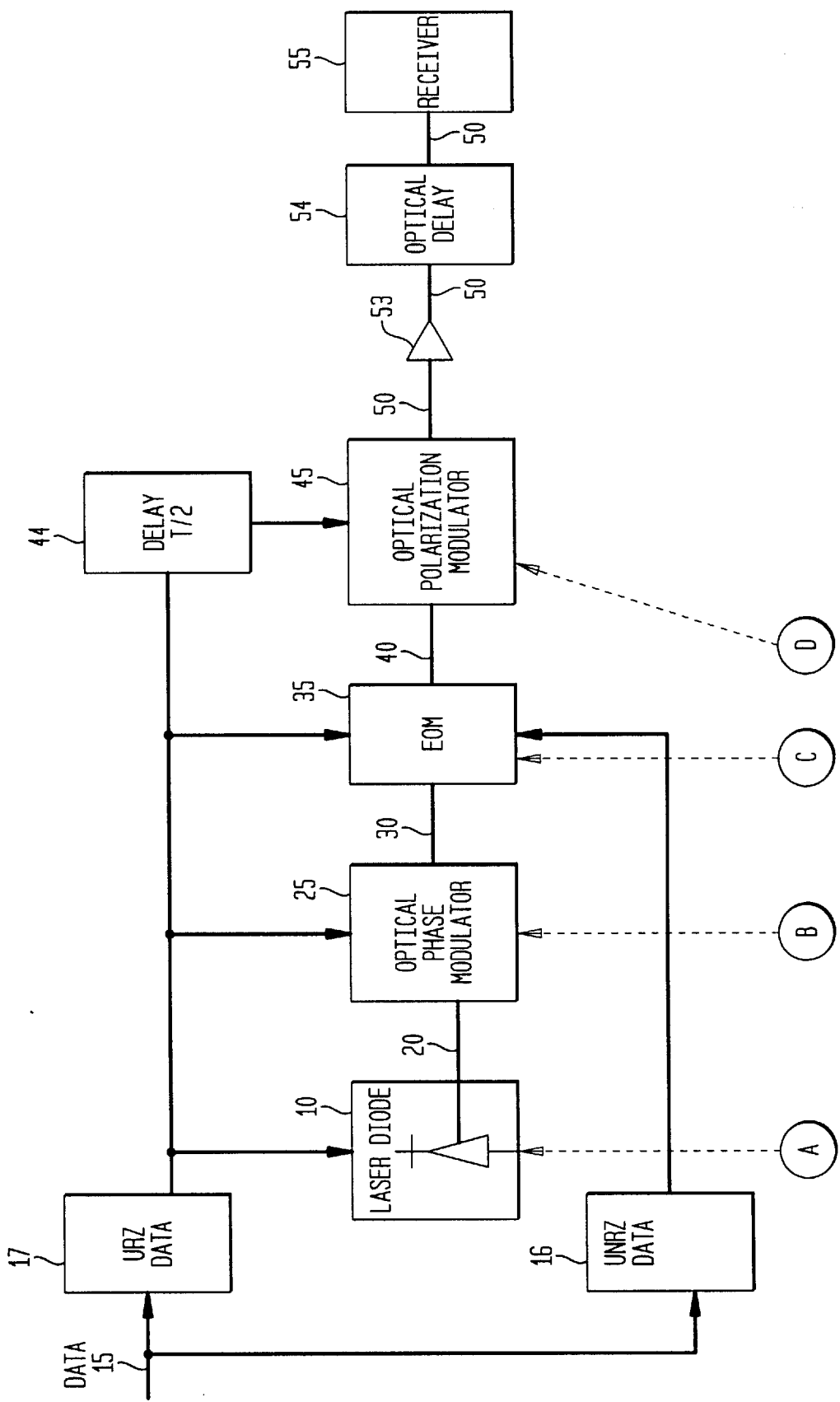
FIG. 2A illustrates an embodiment for carrying out the method of the invention.

FIG. 2A provides a schematic illustration of a preferred embodiment for carrying out the method of the invention. In FIG. 2B, which should be viewed in conjunction with FIG. 2A, illustrative signal waveforms are shown corresponding to an input or output for various stages of the embodiment of FIG. 2A. As can be seen in these figures, particularly FIG. 2A, user data from Information source 15 is directed to UNRZ coder 16 for coding of the data in UNRZ format and to URZ coder 17 for coding of the data in URZ format. An illustrative bit pattern for a sequence of the user data is illustrated in FIG. 2B at the row designated "Data." Juxtaposed above that illustrative bit pattern in FIG. 2B is a representation of the clock pulses for the exemplary system under consideration—row designated "clock" in the figure.

An optical carrier signal which will be modulated by the coded user data is generated by Laser Diode 10. A URZ coded signal of relatively small amplitude may be applied to Laser Diode 10, as illustrated in the figure, to achieve pre-chirp modulation of the laser. Such a pre-chirp modulation signal, of magnitude "a," is shown in FIG. 2B at the row designated "Pre-chirp URZ." As can be seen, the signal waveform for the Pre-chirp URZ signal corresponds to URZ coding for the illustrative data pattern shown at the "Data" row.

An optical output signal from Laser Diode 10 is applied to a section of fiber-optic cable 20 for transmission to an Optical Phase Modulator 25. The Optical Phase Modulator operates to modulate the phase of the transmitted optical carrier signal with a URZ coded representation of the data to be transmitted from Information Source 15. In FIG. 2B, the signal waveform for the URZ-coded signal used to drive the Optical Phase Modulator is shown at the row designated "Optical Phase." Note that the URZ coded signal used for optical phase modulation has magnitude of "b." The output signal from the Optical Phase Modulator is applied to another section of fiber-optic cable 30 and transmitted thereby to External Optical Modulator 35.

The External Optical Modulator 35 operates to modulate the amplitude of the optical carrier signal from Laser Diode 10 with a UNRZ coded representation of the data from Information Source 15. The signal waveform of that UNRZ modulating signal is shown in FIG. 2B at the row designated "EOM." The output of the External Optical Modulator, representing an optical carrier signal having its amplitude modulated with a UNRZ coded representation of the source data and its phase along with pre-chirp modulated with a URZ coded representation of that data, is then transmitted via a section of fiber-optic cable 40 to Optical Polarization Modulator 45.

The Optical Polarization Modulator operates to modulate the polarization of the transmitted optical carrier signal with a delayed URZ$_d$ coded representation or the data to be transmitted from Information Source 15, where the delay is determined to cause the URZ$_d$ signal, as received at a receiver, to be delayed by approximately one-half of a clock interval relative to the URZ signal modulating the phase of the optical carrier signal. Note that the delay function 44 shown in the figure is normally an electrical delay and that an additional optical delay element 54 is shown at the receiver end of the transmission line. The combination of delay element 44 and delay element 54 are cooperatively adjusted to assure that delay of the URZ$_d$ coded signal relative to the URZ coded signal, as received at the receiver, is maintained at approximately one-half of the period of the system clock. It should, however, be recognized that, while the preferred embodiment of the invention incorporates a combination of separate electrical and optical delay elements, the required delay may also be provided in a single delay element which may be optical or electrical. Other combination of delay elements may also be established to achieve the desired goal of a delay of the URZ$_d$ signal relative to the URZ signal at the receiver of approximately one-half the clock period.

In FIG. 2B, the signal waveform for the URZ$_d$ coded signal applied to modulate the optical polarization is shown at the row designated "Optical Polarization." Note that the pulse magnitude for the $URZ_d$ coded signal is equal to "a+b"—i.e., the magnitude of the delayed URZ coded signal must be equal to the sum of the magnitudes of the URZ coded signals applied to modulate the phase and pre-chirp elements. Of course, for the case where the pre-chirp modulation is omitted, the magnitude of the $URZ_d$ coded signal modulating the carrier signal polarization would be equal to the magnitude of the URZ coded signal used to modulate the carrier signal phase. It should also be noted that the magnitude of the $URZ_d$ coded signal—a+b —should be established to be less than or equal to the magnitude of the UNRZ coded signal applied to modulate the amplitude of the carrier signal at the External Optical Modulator.

The output signal from the Optical Polarization Modulator, now representing an optical carrier signal having its amplitude modulated with a UNRZ coded representation of the source data, its phase modulated with a URZ coded representation of that data, and its polarization modulated by a delayed $URZ_d$ coded representation of the source data, is then transmitted via a section of fiber-optic cable 50, possibly through one or more optical amplifiers 53, to Receiver 55.

At the Receiver, both the signal modulated by the UNRZ coded representation of the source data and the pre-chirp, phase and polarization signals modulated by URZ and $URZ_d$ data are demodulated to recover the respective encoded data signals. At that point, the URZ and $URZ_d$ signals are summed, according to the methodology of the companion cross-referenced application designated GEHLOT-7, to provide an equivalent to a UNRZ coded representation of the encoded data.

The UNRZ-equivalent data signal is combined with the received UNRZ data signal to produce a composite signal such as shown at the signal waveform in FIG. 2B designated "Composite Receive Signal is UNRZ with improved SNR." As can be seen in the figure, this resultant UNRZ encoded data signal provides an increased pulse magnitude, which translates directly into a higher probability of the pulse being correctly decoded to recover the transmitted data from the Information Source.

It will of course be apparent to those skilled in the art that some or all of the modulation functions of Optical Phase Modulator 25, External Optical Modulator 35 and Optical Polarization Modulator 45 may be combined into a common structural embodiment, thereby eliminating the sections of fiber-optic cable shown connecting those modulators in the figure. It should also be apparent the URZ and $URZ_d$ modulating signals can be interchanged in respect to modulation of the phase and polarization aspects of the optical carrier signal without affecting the operation of the methodology of the invention.

CONCLUSION

A system and method has been described for modulating phase and polarization aspects of an optical carrier signal with URZ and $URZ_d$ coded representations of source data being transmitted via an optical transmission system using UNRZ coded representations of the source data to modulate the amplitude of the optical carrier system. At a receiver, the URZ and $URZ_d$ signals are summed to provide a UNRZ equivalent encoding of the source data. That UNRZ-equivalent encoded signal is then combined with the UNRZ encoded signal obtained from demodulation of the amplitude modulated optical carrier signal to produce a composite UNRZ encoded representation of the transmitted source data. In carrying out the above-described method of the invention, noise attributable to random fluctuations in phase and polarization of the optical carrier signal is reduced and the composite UNRZ coded signal obtained at the receiver provides a more reliable indicia of the encoded transmitted data, and thus a higher probability of successfully recovering that underlying data through a decoding of that composite signal is provided.

Although the methodology of the invention, and illustrative applications of that methodology, have been described in detail, it should be understood that various changes, alterations, and substitutions can be made therein without departing from the spirit and scope of the invention as defined by the appended claims.

What is claimed is:

1. A method for providing an improved signal to noise ratio (SNR) in an optical transmission system comprising the steps of:

providing a first URZ coded representation of data to be transmitted via said optical transmission system and applying said first URZ-coded data to modulate a first aspect of an optical carrier signal transmitted via said optical transmission system;

providing a second URZ coded representation of said data to be transmitted and applying said second URZ coded data to modulate a second aspect of said optical carrier signal, wherein said second URZ coded data is delayed relative to said first URZ coded data by a predetermined amount;

providing a UNRZ coded representation of said data to be transmitted and applying said UNRZ coded data to modulate a third aspect of said optical carrier signal;

at a receiving location for said optical transmission system, causing said transmitted first URZ, said second URZ and said UNRZ modulated signals to be demodulated;

summing said demodulated first URZ coded data and said demodulated second URZ data; and combining said demodulated UNRZ data with said sum of said demodulated first URZ coded data and said second URZ coded data.

2. The method of claim 1 wherein said first aspect of said optical carrier signal is phase and said second aspect of said optical carrier signal is polarization.

3. The method of claim 1 wherein said first aspect of said optical carrier signal is polarization and said second aspect of said optical carrier signal is phase.

4. The method of claim 1 wherein said third aspect of said optical carrier signal is frequency.

5. The method of claim 1 wherein said third aspect of said optical carrier signal is amplitude.

6. The method of claim 1 wherein said delay for said second URZ coded data is determined to cause said second URZ coded data to be delayed by approximately one-half of a clock interval upon receipt of said data at said receiving location.

7. The method of claim 1 wherein said optical carrier signal is transmitted via said optical transmission system using a single wavelength.

8. An apparatus operable to provide an improved signal to noise ratio (SNR) in an optical transmission system comprising:

coding means for providing a first URZ coded representation of data to be transmitted via said optical transmission system;

modulation means operable to apply said first URZ-coded data to modulate a first aspect of an optical carrier signal transmitted via said optical transmission system;

means for providing a second URZ coded representation of said data to be transmitted, wherein said second URZ coded data is delayed relative to said first URZ coded data by a predetermined amount;

modulation means operable to apply said second URZ coded data to modulate a second aspect of said optical carrier signal;

coding means for providing a UNRZ coded representation of said data to be transmitted;

modulation means operable to apply said UNRZ coded data to modulate a third aspect of said optical carrier signal;

a transmitter operable to cause said first URZ, said second URZ and said UNRZ modulated signals to be transmitted in said optical transmission system;

a receiver linked to said optical transmission system operable to receive said transmitted first URZ, said second URZ and said UNRZ modulated signals and to cause said signals to be demodulated;

means for summing said demodulated first URZ coded data and said demodulated second URZ data; and means for combining said demodulated UNRZ data with said sum of said demodulated first URZ coded data and said second URZ coded data.

9. The apparatus of claim 8 wherein said first aspect of said optical carrier signal is phase and said second aspect of said optical carrier signal is polarization.

10. The apparatus of claim 8 wherein said first aspect of said optical carrier signal is polarization and said second aspect of said optical carrier signal is phase.

11. The apparats of claim 8 wherein said third aspect of said optical carrier signal is frequency.

12. The apparatus of claim 8 wherein said third aspect of said optical carrier signal is amplitude.

13. The apparatus of claim 8 wherein said delay for said second URZ coded data is determined to cause said second URZ coded data to be delayed by approximately one-half of a clock interval upon receipt of said data at said receiving location.

* * * * *